United States Patent
Olesinski et al.

(10) Patent No.: US 7,782,793 B2
(45) Date of Patent: Aug. 24, 2010

(54) STATISTICAL TRACE-BASED METHODS FOR REAL-TIME TRAFFIC CLASSIFICATION

(75) Inventors: Wladyslaw Olesinski, Kanata (CA); Peter Rabinovitch, Kanata (CA)

(73) Assignee: Alcatel Lucent, Paris (FR)

( * ) Notice: Subject to any disclaimer, the term of this patent is extended or adjusted under 35 U.S.C. 154(b) by 899 days.

(21) Appl. No.: 11/226,328

(22) Filed: Sep. 15, 2005

(65) Prior Publication Data
US 2007/0076606 A1    Apr. 5, 2007

(51) Int. Cl.
H04L 12/26 (2006.01)
H04L 12/56 (2006.01)
H04L 12/28 (2006.01)
(52) U.S. Cl. .................... 370/253; 370/391; 370/395.43
(58) Field of Classification Search .................. 370/252
See application file for complete search history.

(56) References Cited

U.S. PATENT DOCUMENTS

| | | | | |
|---|---|---|---|---|
| 6,873,600 | B1 * | 3/2005 | Duffield et al. | 370/252 |
| 7,080,136 | B2 * | 7/2006 | Duffield et al. | 709/223 |
| 7,286,535 | B2 * | 10/2007 | Ishikawa et al. | 370/392 |
| 7,313,100 | B1 * | 12/2007 | Turner et al. | 370/253 |
| 7,376,085 | B2 * | 5/2008 | Yazaki et al. | 370/235 |
| 7,376,731 | B2 * | 5/2008 | Khan et al. | 709/224 |
| 2003/0012197 | A1 * | 1/2003 | Yazaki et al. | 370/392 |
| 2007/0214504 | A1 * | 9/2007 | Comparetti et al. | 726/23 |

FOREIGN PATENT DOCUMENTS

WO    WO 96/38955    12/1996

OTHER PUBLICATIONS

Sun et al., "Statistical Identification of Encrypted Web Browsing Traffic", Microsoft Research for Proc. IEEE Symposium on Security and Privacy, IEEE, May 2002.*

Zhang et al., "Detecting Backdoors", Proceedings of the 9th USENIX Security Symposium Denver, Colorado, Aug. 2000, p. 1-11.*

M. Roughan, S. Sen, O. Spatscheck, N. Duffield, "Class-of-service mapping for QoS: a statistical signature-based approach to IP traffic classification", 2004, pp. 135-148.

(Continued)

*Primary Examiner*—Daniel J. Ryman
*Assistant Examiner*—Cassandra Decker
(74) *Attorney, Agent, or Firm*—Kramer & Amado P.C.

(57) ABSTRACT

Apparatus and methods for real-time traffic classification based on off-line determined traffic classification rules are provided. Traces of real traffic are obtained and subjected to statistical analysis. The statistical analysis identifies the multidimensional domain space of characteristic traffic parameters. Classification rules associated with the identified domains are derived and provided to traffic classification points for real-time traffic classification. Traffic classification points, typically edge network nodes, sample packets in aggregate streams with a predetermined probability. Statistical information regarding the sampled flows is tracked in a table, the number of time a flow was sampled providing a probabilistic measure of the flow's duration before the flow terminates. The table entries, which predominantly track high bandwidth flows, are subjected to the classification rules for real-time classification of the sampled flows. Optionally, rules include an action to be taken in respect of flows having characteristics matching thereof. Advantages are derived from low overhead on-line real-time classification of high-bandwidth flows at low overheads before flow termination.

32 Claims, 2 Drawing Sheets

OTHER PUBLICATIONS

Konstantinos Psounis, Arpita Ghosh, and Balaji Prabhakar: "SIFT: A Low-complexity Scheduler for Reducing Flow Delays in the Internet", 2004, pp. 1-13.

Duffield N et al.: "Estimating Flow Distributions From Sampled Flow Statistics", vol. 33, No. 4, October 20036, pp. 325-336.

Karagiannis, T., et al., Transport Layer Indentification of P2P Traffic, ACM, 2004.

Prabhakar, B., Network Processor Algorithms: Design and Analysis, Stochastic Networks Conference, 2004.

Roughan, M., et al., Class-of-Service Mapping for QoS: A Statistical Signature-Based Approach to IP Traffic Classification, ACM, 2004.

Sen, S., et al., Accurate, Scalable, In-Network Identification of P2P Traffice Using Application Signatures, ACM, 2004.

* cited by examiner

STATISTICAL TRACE-BASED METHODS FOR REAL-TIME TRAFFIC CLASSIFICATION

FIELD OF THE INVENTION

The invention relates to content delivery at the edge of communications networks, and in particular methods and apparatus providing real-time trace-based traffic classification.

BACKGROUND OF THE INVENTION

Traffic classification is important for many reasons in delivering content to customers at the edge of communications networks. For example, Quality of Service (QoS) requires the traffic to be segregated first in order to assign packets to particular Classes of Service (CoS). A network operator can provide a different level of service to each class as well as a pricing structure.

Knowledge of traffic characteristics can help optimize the usage of the communications network infrastructure employed, and can help ensure a desired level of performance for applications/services important to the customers. The intention has always been that application requirements be considered in offering a level of service. Traditional methods of traffic detection and classification rely on monitoring logical port specifications typically carried in packet headers as, in the past, applications and/or services were, in a sense, assigned well known logical ports.

A large percentage of the traffic conveyed by communications networks today consists of peer-to-peer (P2P) traffic. Because peer-to-peer traffic is conveyed between pairs of customer network nodes, it is not necessary that a well known logical port be allocated, reserved, and assigned to traffic generated by applications generating peer-to-peer traffic and/or applications retrieving peer-to-peer content. Therefore known approaches to traffic classification are no longer valid as logical ports are undefined for peer-to-peer applications and/or logical ports may be dynamically allocated as needed such in the case of the standard File Transfer Protocol (FTP) and others.

Peer-to-peer content exchange techniques are increasingly being used to convey without permission content subject to intellectual property protection, such as music and movies. Network operators are under an increasing regulatory pressure to detect peer-to-peer traffic and to control illicit peer-to-peer traffic, while rogue users are seeking ways to defy traffic classification to avoid detection.

Besides peer-to-peer traffic detection, means and methods are being sought on a continual basis for detecting short duration traffic flows to help identify possible intrusions such as, but not limited to, Denial of Service (DOS) attacks.

Statistical billing is another domain in which knowledge of traffic characteristics is necessary. Network operators increasingly employ resource utilization measurements as a component in determining customer charges.

Returning to peer-to-peer traffic detection, not all peer-to-peer traffic is illicit: in view of the high levels of resource utilization demanded by peer-to-peer traffic, network operators may want to charge customers generating peer-to-peer traffic and retrieving peer-to-peer content more for their high bandwidth usage. Resource utilization alone is not always an adequate traffic characteristic differentiator as in many instances content conveyed to, and received from, multiple customers is aggregated at the managed edge and within the managed transport communications network.

Attempts to characterize traffic, to detect traffic types, with a view of classifying traffic, include Deep Packet Inspection (DPI) techniques. Deep packet inspection techniques are described by Sen S., Spatscheck O. and Wang D. in "Accurate, Scalable In-Network Identification of P2P Traffic Using Application Signatures", Proceedings of the 13th international conference on World Wide Web, New York, N.Y., 2004; and by Karagiannis T., Broido A., Faloutsos M., Claffy K. in "Transport layer identification of P2P traffic", Proceedings of the 4th ACM SIGCOMM Conference on Internet Measurement, Taormina, Sicily, Italy, 2004.

Proposed deep packet inspection techniques, as the name suggests, assume the availability of unlimited resources to inspect entire packets to the perform packet characterization. Therefore deep packet inspection incurs high processing overheads and is subject to high costs. Deep packet inspection also suffers from a complexity associated with the requirement of inspecting packet payloads at high line rates. For certainty, deep packet inspection is not suited at all for typical high throughput communications network nodes deployed in current communications networks. Deep packet inspection also suffers from a high maintenance overhead as the detection techniques rely on signatures, peer-to-peer applications, especially, are known for concealing their identities—a deep packet inspection detection signature that provides conclusive detection now may not work in the future, and another conclusive signature would have to be found and coded therein.

Traffic classification means and methods are being actively sought by network operators in order to determine the types of traffic present in a managed communications network for traffic and network engineering purposes, on-line marking of packets, quality of service assessment/assurance, billing, etc. In view of impending regulatory pressures, efficient detection and classification of peer-to-peer traffic is especially desired, as peer-to-peer traffic consumes large, disproportional percentages of bandwidth and other communication network resources. Network operators have to employ a combination of: peer-to-peer traffic control in order to reserve network resources for other types of traffic, charge peer-to-peer users different rates to curb behavior, and/or even block peer-to-peer completely in accordance with regulations imposed on network operators. There therefore is a need to solve the above mentioned issues to provide traffic classification means and methods which avoid the complexities of deep packet inspection and the pitfalls of logical port based packet classification.

SUMMARY OF THE INVENTION

In accordance with an aspect of the invention, a packet flow classification apparatus for on-line real-time traffic flow classification at a communications network node is provided. Packet sampling means randomly selects packets from an aggregate flow with a pre-determined sampling probability. Packet inspection means determines the packet size of each sampled packet and obtains the flow identification of the sampled traffic flow with which the sampled packet is associated. A sampled flow information table has sampled flow table entries for storing real-time sampled flow statistical information. Flow information tracking means maintain the flow information table in real-time. And, a packet classifier classifies sampled traffic flows on-line in real-time based on a group of classification rules trained off-line on statistical trace traffic flow information.

In accordance with another aspect of the invention, a packet flow classification system for on-line real-time traffic flow classification of a plurality of traffic flows conveyed through a network node of a communications network is provided. The packet flow classification system includes: a group of classification rules trained off-line on statistical trace traffic flow information, at least one traffic flow monitor at the communications network node, and a packet classifier for classifying sampled traffic flows on-line in real-time based on the group of off-line trained classification rules. The traffic flow monitor includes: packet sampling means for randomly selecting packets from an aggregate flow with a pre-determined sampling probability, packet inspection means for determining the packet size of each sampled packet and for obtaining flow identification of the sampled traffic flow with which the sampled packet is associated, a sampled flow information table having sampled flow table entries for storing real-time sampled flow statistical information, and flow information tracking means for maintaining the flow information table in real-time .

In accordance with yet another aspect of the invention, a method of classifying traffic flows on-line in real-time based at least one classification rule trained off-line on statistical traffic flow information is provided. Packets are randomly sampled from an aggregate flow with a predetermined sampling probability. The packet size of each sampled packet is extracted. A flow identifier of the sampled traffic flow with which the sampled packet is associated is obtained. Information regarding the sampled flow is tracked in a sampled flow information table entry. And, the sampled traffic flow is classified in real-time by subjecting the information tracked in the flow table entry to the at least one classification rule.

Advantages are derived from simple, low overhead and inexpensive on-line real-time classification of high-bandwidth flows at low overheads before flow termination.

BRIEF DESCRIPTION OF THE DRAWINGS

The features and advantages of the invention will become more apparent from the following detailed description of the exemplary embodiment(s) with reference to the attached diagrams wherein.

Figure 1:
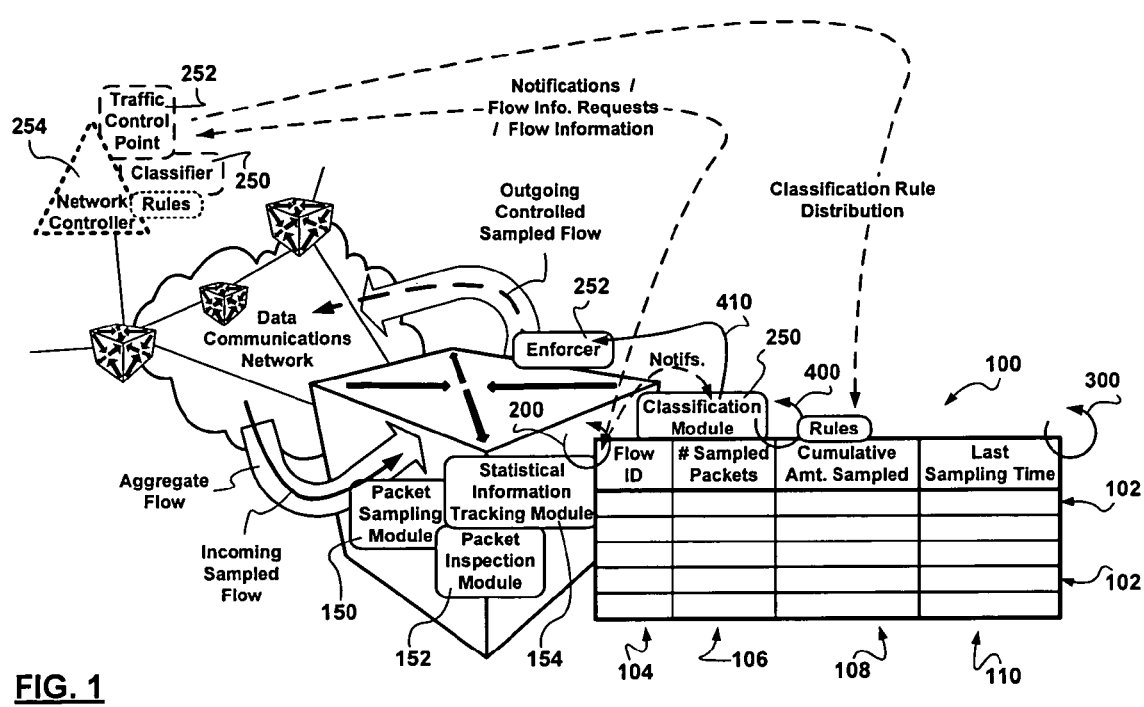
FIG. 1 is a schematic diagram showing an edge communications network element sampling traffic sporadically and tracking statistical flow information in a table in accordance with the exemplary embodiment of the invention.

It will be noted that in the attached diagrams like features bear similar labels.

DETAILED DESCRIPTION OF THE EMBODIMENTS

The realities of Internet service provisioning to customers are such that service level agreements are described in terms of expected aggregate traffic characteristics with the assumption that most of the user traffic is highly bursty and relatively low bandwidth such as the occasional email, intermittent web page download followed by a reading period, and the infrequent electronic bank transaction. Although the equipment is prevalent, video conferencing is relatively rare. Service level agreements include enough long-term transport bandwidth for comparatively higher bandwidth netradio audio streaming. Customers are assumed to be nice and occasional transgressions rarely translate into higher bills at the end of the month. It is assumed that nice customers do not listen to netradio, nor download MP3's from traceable and reputable sources, 24/7. At the same time, in view of the intense competition in communications, the available transport bandwidth in the core of the managed communications network is oversold.

Problems arise when customers engage in illicit/regulated activities such as exchanging large amounts of content subject to intellectual property protection. Such rogue customers do not want to pay higher fees for levels of service which would provide them with increased bandwidth in order not to attract attention to themselves. Sophisticated rogue customers are willing to put up with sending and/or receiving content at transfer rates well bellow aggregate service level agreement limits for long periods of time. Network operators are faced with the conundrum that: rogue customers do not violate their service level agreements; the fact that the rogue customers have not signed up at a higher level of service the resources are overused; and because of the bandwidth is oversold, services provisioned to nice customers are being impacted. Therefore given that input traffic from multiple customers and traffic output to multiple customers is typically aggregated on edge, aggregate traffic metrics only point out that network resources are utilized to a very high degree and that the average and the typical customer is nice.

With the prevalence of peer-to-peer activity, it does not make business sense for network operators to deny services to any user engaging in peer-to-peer file sharing, after all some peer-to-peer traffic such as a video conference is legitimate. What is desired is to identify regulated peer-to-peer traffic in order to reduce the allocation of network resources thereto thereby making the network unfriendly only to questionable/undesirable peer-to-peer traffic.

Current traffic characterization techniques, in order to be effective, employ a determination of particular traffic flows and their duration to determine the amount of resources expended. Because of the willingness of rogue users to make peer-to-peer traffic compliant over the short term with service level agreements subscribed to at the cost of long duration uploads/downloads, knowing the duration of a traffic flow has been found to be very important in characterizing traffic. The trouble is that using current techniques, the duration of a traffic flow can only be found after the traffic flow ends, when is too late to effect any control over the traffic flow. For this very reason, current deep packet inspection techniques, which are designed to detect the initiation and the termination of a traffic flow, are inadequate as a trigger to real-time peer-to-peer traffic control as the traffic classification is provided after the termination of the monitored activity.

Having identified the problem, real-time traffic identification is needed to provide a measure of how the available network resources are utilized by, and partitioned to, rogue customers in real-time. From a business point of view, any solution has to assume that customers are nice. This is necessary both from the customer relations point of view and because assuming the converse, would require a prohibitive amount of resources to be devoted to traffic monitoring.

In "Class-of-Service Mapping for QoS: A statistical signature-based approach to IP traffic classification", ACM SIGCOMM Internet Measurement Workshop, Taormina, Sicily, Italy, 2004, which is incorporated herein by reference, Roughan M., Subhabrata S., Spatscheck O. and Duffield N., address the fact that although various mechanisms exist for providing QoS, QoS has yet to be widely deployed. Roughan et al. are of the opinion that employing previously known techniques to map traffic to QoS classes is prohibitive due to the high overheads incurred. Falling short of providing real-time traffic classification, Roughan et al. predicate their off-line traffic classification solution on the fact that it would be unrealistic for effective traffic classification to inspect every packet, and propose an off-line trace-based statistical method of traffic characterization. Roughan et al. confirm that flow durations are essential in characterizing and distinguishing between different types of traffic. However, just like deep packet inspection techniques, the trace-based methods proposed by Roughan et al. only obtain the flow duration after each flow terminates and are therefore inadequate for real-time traffic characterization.

Other relevant research in the art of packet queuing includes an proposal by Psounis K., Gosh A. and Prabhakar B. entitled "SIFT: A low-complexity scheduler for reducing flow delays in the Internet", Technical report, CENG-2004-01, USC, which is incorporated herein by reference, and describes an algorithm for identifying high bandwidth flows in order to queue packets of identified high bandwidth flows in a special queue. The SIFT proposal includes sampling packets with a pre-selected low probability. With the assumption that most low bandwidth flows consist of few packets, very few low bandwidth flows would be sampled. Conversely high bandwidth flows would be sampled with greater certainty. The flow identifier of each sampled flow is provided to a packet classifier/queue manager which queues every subsequent packet bearing one of the provided flow identifiers into the special queue. The proposed use of the special queue(s) would be prohibitive in terms of the necessary resources for high throughput deployments.

In accordance with the exemplary embodiment of the invention, information is gathered about real typical traffic patterns for statistically relevant periods of time. The outcome of information gathering step is a trace of traffic (packet headers and, possibly, portions of payloads) and perhaps a collection of gathered and/or derived statistics. The trace traffic information is gathered with the intent of subjecting thereof to off-line traffic characterization training.

Because the proposed traffic characterization is performed off-line, information about known and/or determinable traffic flow types may also be used as inputs to a rule creation process referred to as off-line training. Using the trace information, different applications generating/consuming the traffic are identified. Diverse off-line methods can be used for this purpose, for example, the methods described in the above referenced prior art Sen and Karagiannis and other deep packet inspection methods to the extent that portions of payloads have been obtained. This step associates traffic flows with the applications.

Classes of traffic, or traffic types, are defined. For example, Roughan et al. propose the following exemplary traffic classes:
  interactive, including: remote login sessions, interactive Web content access, etc;
  bulk data transfer, including: FTP, music downloads, peer-to-peer traffic, etc.;
  streaming, including video conferencing, netradio, etc.; and
  transactional, including: distributed database access.

Traffic characterization means are employed off-line to characterize the traffic flows based on the gathered trace information and the associated statistics, to create off-line rules based on statistical properties of the gathered information and the application associativity. The outcome of the characterization step is a relation between traffic statistics (packet sizes, flow durations, etc.), application associativity and the traffic classes the traffic flows belong to. In creating the rules, Roughan et al. propose subjecting the traffic flow statistical parameters to statistical analysis in order to define domains in the multi-dimensional space of statistical flow parameters. Subjecting traffic flow statistical parameters to statistical analysis is referred herein as training. The domains correspond to statistically distinct traffic classes. Statistical analysis methods include, but are not limited to, Nearest Neighbour (NN), Linear Discriminant Analysis (LDA), etc. Given traffic classes, gathered statistics, trace information, and application associativity, a set of rules are trained for classifying future data is determined.

For example assuming that only two statistics: average packet sizes and session durations, are all that is needed to characterize traffic, a rule can indicate that if an average duration of a traffic flow is greater than 40 seconds, and average packets of that traffic flow do not exceed 300 bytes, then the traffic flow most likely belongs to interactive class (e.g., a Telnet session). As another example, peer-to-peer flows, based on the number of packets conveyed, statistically fall into bulk data transfer flows and streaming flows, however average packet sizes would characterize peer-to-peer flows as bulk data transfer flows regardless of the application or logical port used to convey the content. Beside flow durations, traffic flows can be characterized based on statistical traffic flow parameters such as: average/median packet size, packet size variance, root-means-square packet size, largest packet sampled so far, shortest packet sampled so far, average/median inter-packet arrival delay, inter-packet arrival delay variance, bytes per flow, packets per flow, etc.

In accordance with an exemplary implementation of the exemplary embodiment of the invention, classification rules pertaining to expected/uninteresting traffic patterns may be deleted from the off-line determined set of classification rules. Reducing the number of classification rules provides desirable overhead reductions.

Proposed real-time methods include real-time statistics collection and real-time traffic classification.

In accordance with the exemplary embodiment of the invention, random packet sampling techniques are employed on a monitored aggregated flow irrespective of the individual aggregated flows contained therein for the purpose of estimating flow durations of individual sampled flows. Random packet sampling techniques conform to the desired assumption that initially all customers' traffic flows are nice.

In accordance with the exemplary embodiment of the invention, network elements shown in FIG. 1 such as, but not limited to, edge switching equipment and routing equipment, include packet selection means 150, packet inspection means 152, statistical information tracking means 154, and a flow information table 100, having sampled flow table entries 102. Each sampled flow entry 102 exemplary includes fields for the flow identifier 104, the number of packets sampled 106, the cumulative amount of content sampled 108, sampling time of the last packet 110. All information necessary to populate and update the fields 104, 106, 108 and 110 can either be extracted by the packet inspection means 152 or derived by the statistical information tracking means 154 from information extracted from sampled packet headers. For certainty, dependent on the implementation, the packet selection means 150, the packet inspection means 152, the statistical information tracking means 154, and the flow information table 100, without limiting the invention, can be associated with a physical port, a logical port, a group of physical/logical ports, all ports, etc. Also, depending on the implementation, the proposed traffic monitoring may only be performed on best-effort traffic and/or available bit rate traffic conveyed by the implementing equipment.

Figure 2:
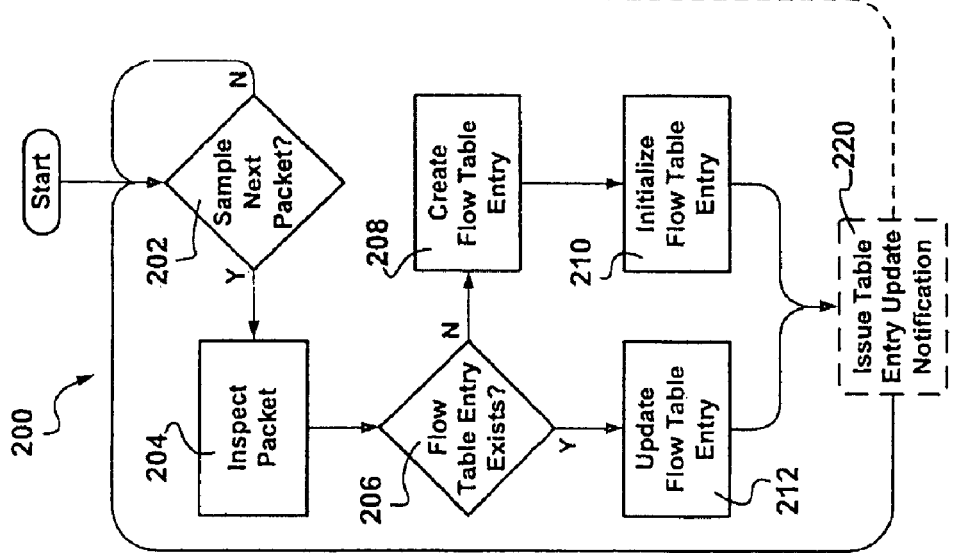
FIG. 2 is a flow diagram showing process steps in sampling traffic sporadically and tracking statistical flow information in a table in accordance with the exemplary embodiment of the invention.

In accordance with the exemplary embodiment of the invention, a real-time traffic monitoring process 200 shown in FIG. 2 maintains the flow information table 100. Based on a preset sampling probability, the traffic monitoring process 200 determines 202 whether to sample the next packet upon arrival. If the next packet is to be sampled, then the process 200, waits for the next packet to arrive, and inspects 204 the received packet to extract information such as, but not limited to, flow identification, and packet size. Typically, the packet inspection 204 is typically limited to reading at most the packet header, application layer connection information hidden in packet payloads is typically not searched for. Existing packet inspection means otherwise used in packet processing may be reused.

If a flow table entry 102 for the identified flow does not exist 206 in the flow information table 100, then a flow table entry 102 is created 208 and the flow table entry is initialized 210. Initializing 210 the flow table entry 102 includes, but is not limited to, filing in the flow identifier field 104, setting the number of sampled packets 106 to 1, setting the cumulative amount of content sampled 108 to the size of the sampled packet, and writing the sampling time in field 110.

If a flow table entry 102 exists for the identified flow, then the fields of the table entry 102 are updated 212 by: incrementing the number of sampled packets 106 by 1, adding the size of the sampled packet to the cumulative amount of content sampled 108, and overwriting field 110 with the sampling time.

Having created 208 or updated 212 the flow table entry 102, the monitoring process 200 resumes from step 202. The resumption may include the issuance 220 of a notification that the particular flow entry 102 has been updated.

In accordance with the exemplary embodiment of the invention, the number of times a traffic flow is sampled, regardless of the number of actual packets associated with the corresponding traffic flow being conveyed, is representative of the duration of the traffic flow so far. In view of the off-line training, the number of packets sampled so far, perhaps together with the other statistical values tracked in the flow table entry 102, is representative of the actual duration of the traffic flow. Therefore duration of a sampled flow can be forecasted before the traffic flow terminates within statistical certainty when the field values in the corresponding flow entry table match a rule.

Tracking the cumulative amount of sampled content and the number of sampled packets is equivalent to tracking the average packet size without requiring performing division as packets are sampled in real-time at substantial overhead reductions.

Figure 3:
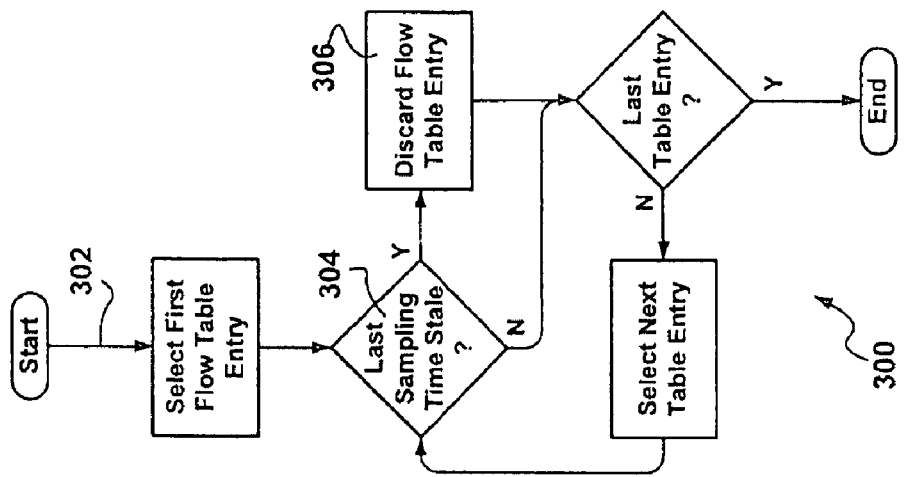
FIG. 3 is a flow diagram showing process steps of a cleanup process ensuring that the statistical information in a flow information table is current, in accordance with the exemplary embodiment of the invention.

An exemplary parallel flow information table clean-up process 300, shown in FIG. 3 inspects 304 sampling times specified in flow table entries 102 and discards 306 stale entries 102. The clean-up process 300 executes 302 in accordance with a clean-up discipline, for example periodically.

The monitoring process 200 and the clean-up process 300, identify the existence of, and monitor, suspect traffic flows on-line and in real-time. The number of sampled packets of each flow entry 102 in the flow table 100 provides an estimation of the duration of each flow. And, the clean-up process 300 makes up for the lack of a determination of the exact time when monitored flows terminate. Having real-time statistical information regarding current high bandwidth flows presents the network operator with the most plausible flows to consider in identifying illicit/regulated content transfers regardless of the rogue customers' attempts to foil detection.

Figure 4:
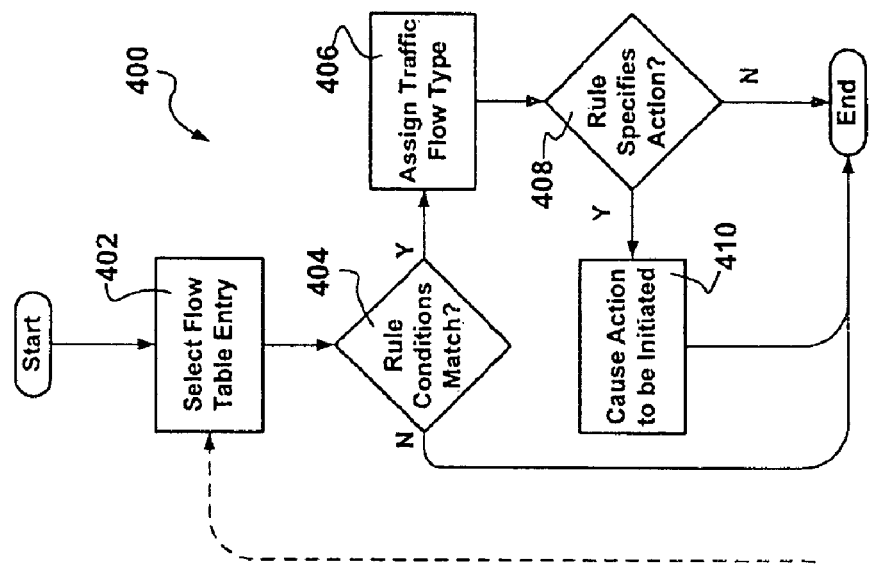
FIG. 4 is a flow diagram showing process steps of an on-line real-time classification process classifying high-bandwidth sampled flows in accordance with the exemplary embodiment of the invention.

In accordance with an exemplary implementation of the exemplary embodiment of the invention, an on-line real-time traffic classification entity 250, typically associated with the traffic control point 252, is provided with the traffic classification rules and performs an on-line real-time classification process 400 as exemplary shown in FIG. 4. Accordingly, on-line real-time traffic classification is achieved by subjecting 404 the suspect traffic flows monitored via the flow information table 100 to the off-line trained classification rules. Simply put, subjecting flow entry 102 to each rule answers the question whether the sampled flow, to which the flow entry 102 corresponds, has statistical characteristics which would locate the traffic flow in the multi-dimensional domain expressed in the rule. Without limiting the invention, the on-line real-time classification process 400, may be triggered 402 via notifications 220 or in accordance with a discipline, for example on a schedule or periodically. If there is a hit 404 in respect of a traffic flow, the classification rule hit specifies 406 the traffic class/type. Accordingly, information about the current state of the monitored communications network is provided allow the network operator to use this information to take further action in respect of specific flows in real-time if and when necessary.

In accordance with the exemplary embodiment of the invention, the off-line trained traffic classification rules are also used to identify illicit/regulated content transfers from the suspect flows identified. Depending on implementation, and without limiting the invention, rule hits 404 may either be (410) logged, alarms may be raised, and/or traffic control may be enforced at a traffic control point 252. Depending on implementation, and/or if the rule applies to illicit/regulated traffic, the rules themselves may also specify 408 appropriate actions.

In accordance with an exemplary implementation of the invention, actions specified 408 via the classification rules, without limiting the invention, include, marking packets of the sampled flows, assignment of packet processing priorities, assignment of sampled flow packets to specific classes-of-service, special processing of different traffic types, precise monitoring of traffic, etc.; wherein special packet processing includes discarding packets of the sampled flow.

In accordance with exemplary implementations of the exemplary embodiment of the invention, depending on the content transport technology deployed, traffic control may be effected on the actual edge network node as in the exemplary case of Internet Protocol deployments, or effected centrally as in the exemplary case of A synchronous Transfer Mode deployments.

If the traffic classification entity 250 is remote with respect to the network node maintaining the flow information table 100, typically co-located with other centralized network provisioning functions, the statistical information in the flow information table 100 is exported thereto in accordance with an export discipline and/or in response to a request from a network controller 254. Because only high-bandwidth flows are sampled, and because the high-bandwidth flows are sampled sparingly, it is envisioned that the remote traffic classification entity 250 can be provided with appropriate notifications (220) for each change to the flow information table 100. However, for high density deployments, multiple flow information table change notifications 220 may be accumulated and the accumulated notifications are transmitted at reduced management overheads. In an exemplary ATM deployment, statistical connection (flow) information is exported to an off-board network controller 254, the traffic classification entity 250 is associated with the network controller 254 which implements functions of the traffic control point 252.

In accordance with an exemplary implementation of the exemplary embodiment of the invention, the traffic classification entity 250 is located within the network element sampling traffic, as is the traffic control point 252. While such an arrangement would introduce a small and sporadic rule distribution overhead, it would reduce the larger statistical flow information reporting overhead necessary for centralized traffic classification described above. In accordance with another exemplary implementation of the exemplary embodiment of the invention, the network element sampling traffic has means for retrieving the group of off-line trained classification rules. In an exemplary IP deployment, the traffic classification entity 250 is implemented on a control card of a modular network node, existing functions of the control card representing the traffic control point 252.

It was mentioned above that actions 408 specified via the classification rules include precise monitoring of traffic. It is envisioned that precise monitoring of traffic include deep packet inspection. For certainty, deep packet inspection, when necessary, would be performed after real-time traffic classification only on suspect traffic flows sampled, at substantial packet processing overhead reductions.

Accordingly, acquired knowledge derived from the off-line statistical analysis is used via the trained classification rules to perform on-line real-time classification of traffic in a managed communications network. For clarity, while deep packet inspection may be used off-line to identify traffic characteristics prior to training the classification rules, deep packet inspection is not used in performing on-line real-time traffic classification making the proposed solution suitable for high throughput applications.

Because the solution does not need to track customers, just flows irrespective of customers, the assessment preserves the customers' anonymity while any flow control exercised ensures that the network resources are shared by all customers in a fair fashion.

The embodiments presented are exemplary only and persons skilled in the art would appreciate that variations to the above described embodiments may be made without departing from the spirit of the invention. The scope of the invention is solely defined by the appended claims.

We claim:

1. A packet flow classification apparatus for on-line real-time traffic flow classification in a communications network of packet switches, each packet switch being any of a packet router and a network edge switch, the packet flow classification apparatus comprising:

a first packet switch among the packet switches further configured to randomly select packets from an aggregate flow to generate sampled packets, and to inspect the sampled packets to obtain a flow identification for and a packet size of each sampled packet, and to generate a sampled flow information table based in part on the determined packet size and the obtained flow identification, a. wherein said first packet switch is further configured to randomly select packets with a pre-determined sampling probability, b. wherein said first packet switch is further configured to generate a corresponding packet size and flow identification result based on the determined packet size and the obtained flow identification, c. wherein said first packet switch is further configured to generate the sampled flow information table to have sampled flow table entries corresponding to sampled traffic flows, said sampled flow table entries for storing real-time sampled flow statistical information for each of the sampled traffic flows, each sampled flow table entry comprising a number of packets sampled, a cumulative amount of traffic content sampled so far, and at least one of an average packet size, a median packet size, a packet size variance, a root-mean-square packet size, a size of the largest packet sampled so far, a size of the shortest packet sampled so far, an average inter-packet arrival delay, a median inter-packet arrival delay, an inter-packet arrival delay variance, and a number of sampled bytes, and d. wherein said first packet switch is further configured to track a flow information by maintaining the sampled flow information table in real-time, based on the flow identification result and including incrementing the number of packets sampled and using the corresponding packet size to update the cumulative amount of traffic content sampled so far; and a second packet switch from among the packet switches further configured to store a group of classification rules to classify high bandwidth traffic flow, and to classify the traffic class/type of a sampled traffic flow on-line in real-time as an illicit or regulated traffic class, prior to termination of the sampled traffic flow, wherein e. the group of classification rules is trained off-line on statistical trace traffic flow information, to classify high bandwidth traffic flows according to traffic class/type based on at least one other of said real-time sampled flow statistical information, and f. wherein said second packet switch is further configured to classify the traffic class/type of a sampled traffic flow on-line in real-time as an illicit or regulated traffic class, prior to termination of the sampled traffic flow, by forecasting to a given statistical certainty a duration of the sampled traffic flow based on the number of packets sampled and, based on the forecast duration, to identify whether the sampled traffic flow is a suspect high bandwidth traffic flow and, in response to identifying the sampled traffic flow as a suspect high bandwidth traffic flow, to subject the suspect high bandwidth traffic flow's sampled flow statistical information stored in the sampled flow information table to the group of off-line trained classification rules to identify whether the classified traffic class/type of the suspect high bandwidth traffic flow is an illicit or regulated traffic class/type.

2. The packet flow classification apparatus of claim 1, wherein said first packet switch is configured to generate each sampled flow table entry to further store the time of the last packet sampling.

3. The packet flow classification apparatus of claim 2, wherein the first packet switch is further configured to include in the tracking a flow information by maintaining the sampled flow information table in real-time a discarding a sampled flow table entry having a stale last packet sampling time.

4. The packet flow classification apparatus of claim 1, wherein the first packet switch is configured to send a notification to the second packet switch of one of the creation, an update, and the deletion of a sampled flow table entry performed while tracking the flow information.

5. The packet flow classification apparatus of claim 1, wherein the first packet switch is a communications network node configured to perform said sampling in association with at least one of a port of the communications network node, a group of ports of the communications network node, a trunk, a best-effort traffic processed at the communications network node, an available bit rate traffic processed at the communications network node, and a control card of the communications network node.

6. The packet flow classification apparatus of claim 1, wherein each classification rule further specifies an action to be taken on subsequent packets constituent of the classified sampled traffic flow, and wherein at least one of the first packet switch and the second packet switch is further configured to implement the actions specified by the classification rules.

7. The communications network node of claim 6, wherein the action comprises at least one of: marking, assigning a class-of-service to, ascribing a packet processing priority to, queuing, diverting, inspecting, and discarding the subsequent packets associated with the classified sampled traffic flow.

8. The packet flow classification apparatus of claim 1 wherein the first packet switch and the second packet switch are both embodied within a common packet switch among the packet switches.

9. The packet flow classification apparatus of claim 1 wherein the first packet switch and the second packet switch are different packet switches within the communications network.

10. A packet flow classification system for on-line real-time traffic flow classification of a plurality of traffic flows conveyed through a network node of a communications network of network nodes, said network nodes comprising packet switches, each packet switch being any of a packet router and a network edge switch, the packet flow classification system comprising:
    a. a first packet switch from among the packet switches further configured to store a group of classification rules trained off-line on statistical trace traffic flow information, said classification rules including a flow duration classifier rule trained to classify traffic flow duration based on real-time sampled flow statistical information, said real-time sampled flow statistical information comprising a number of packets sampled and at least one other real-time sampled flow statistical information, prior to termination of a traffic flow;
    b. a second packet switch from among the packet switches further configured to perform at least one traffic flow monitor operation, the traffic flow monitor operation including:
        i. randomly selecting packets from an aggregate flow with a pre-determined sampling probability;
        ii. determining the packet size of each sampled packet, obtaining flow identification of a sampled traffic flow with which the sampled packet is associated, and generating a corresponding packet size and flow identification result;
        iii. storing a sampled flow information table having sampled flow table entries corresponding to sampled traffic flows for storing real-time sampled flow statistical information for each of the sampled traffic flows, each sampled flow table entry comprising a number of packets sampled, a cumulative amount of traffic content sampled so far, and at least one other real-time sampled flow statistical information, said at least one other real-time sampled flow statistical information comprising at least one of an average packet size, a median packet size, a packet size variance, a root-mean-square packet size, a size of the largest packet sampled so far, a size of the shortest packet sampled so far, an average inter-packet arrival delay, a median inter-packet arrival delay, an inter-packet arrival delay variance, and a number of sampled bytes; and
        iv. maintaining the sampled flow information table in real-time, based on the flow identification result and including incrementing the number of packets sampled and using the packet size to update the cumulative amount of traffic content sampled so far,
    wherein the first packet switch is further configured to classify the traffic class/type of a sampled traffic flow on-line in real-time as an illicit or regulated traffic class, prior to termination of the sampled traffic flow, by forecasting to a given statistical certainty a duration of the sampled traffic flow flows based on the number of packets sampled and, based on the forecast duration, identifying whether the sampled traffic flow is a suspect high bandwidth traffic flow and, in response to identifying the sampled traffic flow as a suspect high bandwidth traffic flow, subjecting the suspect high bandwidth traffic flow's sampled flow statistical information stored in the sampled flow information table to the group of off-line trained classification rules to identify whether the classified traffic class/type of the suspect high bandwidth traffic flow is an illicit or regulated traffic class/type.

11. The packet flow classification system of claim 10, wherein each sampled flow table entry further stores the time of the last packet sampling.

12. The packet flow classification system of claim 11, wherein the second packet switch is further configured to include in the tracking a flow information by maintaining the sampled flow information table in real-time a discarding a sampled flow table entry having a stale last packet sampling time.

13. The packet flow classification system of claim 10, wherein the first packet switch is further configured as being associated with a network controller, and the second packet switch is further configured to provide the sampled traffic flow information stored in the sampled flow information table to one of the network controller and the first packet switch classifier, and wherein the first packet switch is further configured to classify the traffic class/type of a sampled traffic flow on-line in real-time as an illicit or regulated traffic class further based on the sampled traffic flow information received from the sampled flow information table stored in the second packet switch.

14. The packet flow classification system of claim 13, wherein the second packet switch is further configured to notify one of the network controller and the packet classifier of one of flow table entry creation, update, and deletion.

15. The packet flow classification system of claim 14, wherein at least one of the network controller and the first packet switch is further configured to retrieve information stored in the sampled flow information table of the second packet switch.

16. The packet flow classification system of claim 10, each classification rule further specifying an action to be taken on subsequent packets constituent of the classified sampled traffic flow, wherein at least one of the first and the second packet switches is further configured to implement the actions specified by the classification rules.

17. The packet flow classification system of claim 16, wherein the action comprises one of: marking, assigning a class-of-service to, ascribing a packet processing priority to, queuing, diverting, inspecting, and discarding the subsequent packets associated with the classified sampled traffic flow.

18. The packet flow classification system of claim 10, wherein the first packet switch is a communications network node configured to perform said sampling in association with at least one of a port of the communications network node, a group of ports of the communications network node, a trunk, a best-effort traffic processed at the communications network node, an available bit rate traffic processed at the communications network node, and a control card of the communications network node.

19. The packet flow classification system of claim 10 wherein the first packet switch and the second packet switch are both embodied within a common packet switch among the packet switches.

20. The packet flow classification system of claim 10 wherein the first packet switch and the second packet switch are different packet switches within the communications network.

21. A method of classifying packet traffic flows within a network of packet switches, each packet switch being any of a packet router and a network edge switch, on-line in real-time based on at least one classification rule trained off-line on statistical traffic flow information, the method comprising:
 a. providing to a first packet switch among the packet switches a group of at least one classification rule trained off-line on statistical traffic flow information to classify an estimated long duration flow as an illicit or regulated class/type based on at least one of an average packet size, a median packet size, a packet size variance, a root-mean-square packet size, a size of the largest packet sampled so far, a size of the shortest packet sampled so far, an average inter-packet arrival delay, a median inter-packet arrival delay, an inter-packet arrival delay variance, a number of sampled bytes, and a cumulative amount of traffic content sampled so far;
 b. at a second packet switch among the packet switches, randomly sampling packets, with a predetermined sampling probability, from an aggregate of a plurality of traffic flows conveyed via said packet switch to generate sampled packets;
 c. extracting, at the second packet switch, the packet size of each sampled packet;
 d. obtaining, at the second packet switch, a flow identifier of a sampled traffic flow with which the sampled packet is associated;
 e. storing, at the second packet switch, a tracking information, in a sampled flow information table held at the communications network node, regarding the sampled traffic flow based on a result of obtaining a flow identifier, said storing including storing said traffic information as a flow table entry in the sampled flow information table, said flow table entry corresponding to the sampled traffic flow, said flow table entry comprising a number of packets sampled and at least one of an average packet size, a median packet size, a packet size variance, a root-mean-square packet size, a size of the largest packet sampled so far, a size of the shortest packet sampled so far, an average inter-packet arrival delay, a median inter-packet arrival delay, an inter-packet arrival delay variance, a number of sampled bytes, and a cumulative amount of traffic content sampled so far; and
 f. classifying, at the first packet switch, the sampled traffic flow as an illicit or regulated traffic class, prior to termination of the sampled traffic flow, in real-time, said classifying including
  i. identifying whether the flow table entry corresponds to a suspect traffic flow, said identifying including forecasting to a given statistical certainty a duration of the sampled traffic flow, based on the number of packets sampled, and, based on the forecast duration, identifying whether the sampled traffic flow is a suspect high bandwidth traffic flow and,
  ii. in response to identifying the sampled traffic flow as a suspect high bandwidth traffic flow, subjecting the suspect high bandwidth traffic flow's corresponding flow table entry to the group of off-line trained classification rules to identify whether the classified traffic/class of the suspect high bandwidth traffic flow is an illicit or regulated traffic class.

22. The method of claim 21, wherein each flow table entry further stores the time of the last packet sampling, the method further comprising discarding a flow table entry having a stale last packet sampling time.

23. The method of claim 21, wherein the subjecting the flow table entry to the at least one classification rule includes determining whether the flow table entry specifies that the corresponding sampled traffic flow is one having statistical characteristics locating the sampled traffic flow in a domain defined by at least one statistical parameter as specified via the at least one classification rule.

24. The method of claim 21, further comprising obtaining the at least one off-line trained classification rule from a location in a communications network.

25. The method of claim 21, wherein said tracking information regarding the sampled traffic flow further includes one of creating, updating and deleting the flow table entry.

26. The method of claim 25, further comprising issuing a notification from the second packet switch specifying one of the creation, the update, and the deletion of a flow table entry, and the classifying step at the first packet switch being responsive to the notification.

27. The method of claim 26, wherein a network controller is configured to store said group of at least one classification rule trained off-line on statistical traffic flow information, and to perform said classifying, and wherein the method further comprises exporting from the second packet switch to the network controller the tracking information regarding the sampled traffic flow held as a flow table entry in the sampled flow information table held at the second packet switch.

28. The method of claim 27, further comprising the network controller requesting said exporting of the tracking information regarding the sampled traffic flow information held in the flow table entry specified in the notification.

29. The method of claim 21, wherein each classification rule further specifies an action to be taken on subsequent packets constituent of the classified sampled traffic flow, the method further comprising implementing the action.

30. The method of claim 29, wherein implementing the action further comprises at least one of: marking, assigning a class-of-service to, ascribing a packet processing priority to, queuing, diverting, inspecting, and discarding the subsequent packets associated with the classified sampled traffic flow.

31. The method of claim 21 wherein the first packet switch and the second packet switch are both embodied within a common packet switch among the packet switches.

32. The method of claim 21 wherein the first packet switch and the second packet switch are different packet switches within the communications network.

* * * * *

UNITED STATES PATENT AND TRADEMARK OFFICE
CERTIFICATE OF CORRECTION

PATENT NO. : 7,782,793 B2 Page 1 of 1
APPLICATION NO. : 11/226328
DATED : August 24, 2010
INVENTOR(S) : Wladyslaw Olesinski et al.

It is certified that error appears in the above-identified patent and that said Letters Patent is hereby corrected as shown below:

Column 12, Claim 10, line 14, please delete "flows"

Signed and Sealed this

Twelfth Day of October, 2010

David J. Kappos
*Director of the United States Patent and Trademark Office*